(12) United States Patent
Bunker et al.

(10) Patent No.: US 7,909,507 B2
(45) Date of Patent: Mar. 22, 2011

(54) THERMAL INSPECTION SYSTEM AND METHOD

(75) Inventors: Ronald Scott Bunker, Niskayuna, NY (US); Nirm Velumylum Nirmalan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 445 days.

(21) Appl. No.: 12/101,285

(22) Filed: Apr. 11, 2008

(65) Prior Publication Data
US 2009/0255332 A1    Oct. 15, 2009

(51) Int. Cl.
  G01N 25/00    (2006.01)
  G01J 5/00    (2006.01)
  G01K 13/00    (2006.01)
(52) U.S. Cl. ............. 374/121; 374/43; 374/45; 374/148
(58) Field of Classification Search .................. 374/121, 374/43, 45, 148
See application file for complete search history.

(56) References Cited

U.S. PATENT DOCUMENTS

| | | | |
|---|---|---|---|
| 4,067,237 A | 1/1978 | Arcella | |
| 4,621,929 A | 11/1986 | Phillips | |
| 4,644,162 A | 2/1987 | Bantel et al. | |
| 4,896,281 A | 1/1990 | Mack | |
| 5,111,046 A | 5/1992 | Bantel | |
| 5,328,331 A | 7/1994 | Bunker et al. | |
| 5,773,790 A * | 6/1998 | Moore et al. | 219/121.71 |
| 6,422,743 B1 | 7/2002 | Nirmalan et al. | |
| 6,732,582 B2 | 5/2004 | Bunker et al. | |
| 6,804,622 B2 | 10/2004 | Bunker et al. | |
| 6,909,800 B2 * | 6/2005 | Vaidyanathan | 382/152 |
| 7,040,805 B1 * | 5/2006 | Ou et al. | 374/43 |
| 2002/0011852 A1 | 1/2002 | Mandelis et al. | |
| 2004/0037344 A1 * | 2/2004 | Bunker et al. | 374/40 |
| 2009/0016402 A1 * | 1/2009 | Bunker et al. | 374/43 |
| 2009/0297336 A1 * | 12/2009 | Allen et al. | 415/118 |

FOREIGN PATENT DOCUMENTS

| | | |
|---|---|---|
| JP | 1201165 | 8/1989 |
| WO | 2005054834 | 6/2005 |

OTHER PUBLICATIONS

JP1201165 Abstract, Aug. 14, 1989.

(Continued)

*Primary Examiner* — Lisa M Caputo
*Assistant Examiner* — Mirellys Jagan
(74) *Attorney, Agent, or Firm* — Penny A. Clarke

(57) ABSTRACT

A thermal inspection method is provided for a component comprising at least one complex internal passage arrangement defining at least one opening. The thermal inspection method includes flowing a fluid through the at least one complex internal passage arrangement. The fluid has an initial temperature that differs from an initial temperature of the component. The thermal inspection method further includes measuring a thermal response of the component to the fluid flow and analyzing the thermal response to determine a number of heat transfer coefficients $\{h_{lmn}\}$ corresponding to respective locations $\{l,m,n\}$ within the complex internal passage arrangement. The thermal inspection method further includes using the heat transfer coefficients $\{h_{lmn}\}$ to determine at least one of (a) a flow rate through respective ones of the at least one opening, and (b) a cross-sectional area for respective ones of the at least one opening.

18 Claims, 5 Drawing Sheets

OTHER PUBLICATIONS

A. Daniels, "Non-destructive Pulsed Infared Quantitative Evaluation of Metals," Thermosense XVIII: An International Conference on Thermal Sensing and Imaging Diagnostic Applications, Apr. 10-12, 1996, Orlando, Florida, vol. 2766, pp. 185-201.

"Thermography Inspecton System for Gas Turbine Blades," 7th ECNDT, Copenhagen, May 1998, 8 pages.

J. Stiglich, Jr., et al., "The Thermal Inertia Analysis Technique in Gas Turbine Component Reliability Assessment," Oct. 12-15, 1998, 14 pages.

M. Lin et al., "A Transient Liquid Crystal Method Using Hue Angle and a 3-D Inverse Transient Conduction Scheme," ASM Gas Turbines Material Technology Conference, Oct. 12-15, 1998, 7 pages.

Nirm V. Nirmalan et al., "The Measurement of Full-Surface Internal Heat Transfer Coefficients for Turbine Airfoils Using a Nondestructive Thermal Inertia Technique," Journal of Turbomachinery, Jan. 2003, vol. 125, Issue 1, pp. 83-89.

R.S. Bunker et al., "System and Method for Thermal Inspection of Parts," U.S. Appl. No. 11/775,502, filed Jul. 10, 2007.

* cited by examiner

THERMAL INSPECTION SYSTEM AND METHOD

This invention was made with Government support under contract number F33615-98-C-2893 awarded by the United States Air Force (USAF). The Government has certain rights in the invention.

BACKGROUND for the remaining holes or groups of holes, or flow circuits. The process is repeated with various holes or passages blocked until all desired measurements have been made. Comparisons to either gauge measurements on reliable parts or to analytical models of flow circuits determines the acceptability of the parts. However, the technique is known to be time consuming resulting in a check of only selective film holes, groups of holes, or flow circuits. Additionally, the technique has the propensity to overlook local or individual features or holes that are out of specification.

Other techniques include dimensional gauges, for example pin checks, and other visual methods, for example water flow. Industry typically relies on these methods to determine the quality of each part as compared to a nominal standard part or a specification. Certain types of interior wall flow holes or orifices can be inspected by means of boroscopes, but only when the dimensions of the access regions within the parts are large enough. Non-destructive inspection methods, such as ultrasound and x-ray, are used to detect material flaws and dimensions, but are limited to the immediate surface and wall under the inspection device. Accordingly, ultrasound and x-ray inspection techniques cannot detect across a void to an interior wall, and, as such, are not applicable for inspecting blind flow holes in integrally cast components.

Thermal transient methods are used to detect material flaws, voids, thicknesses, and external surface hole depths, but again operate only on the immediate wall beneath the detection device. Commonly assigned U.S. Pat. No. 6,804,622, Bunker et al., entitled "Method and apparatus for non-destructive thermal inspection," discloses the use of transient infrared thermal imaging to measure the heat transfer coefficients on the interior surface of an exterior wall. However, the heat transfer coefficients do not, by themselves, provide a quantitative measurement of the fluid flow through blind holes, nor do they provide a quantitative measurement of the cross-sectional area of the blind holes.

It would therefore be desirable to provide a non-destructive inspection method and system for quantitatively measuring the flow rate and cross-sectional area of interior blind flow holes.

BRIEF DESCRIPTION

Briefly, one aspect of the present invention resides in a thermal inspection method for a component comprising at least one complex internal passage arrangement defining at least one opening. The thermal inspection method includes flowing a fluid through the at least one complex internal passage arrangement. The fluid has an initial temperature that differs from an initial temperature of the component. The thermal inspection method further includes measuring a thermal response of the component to the fluid flow and analyzing the thermal response to determine a number of heat transfer coefficients $\{h_{lmn}\}$ corresponding to respective locations $\{l,m,n\}$ within the complex internal passage arrangement. The thermal inspection method further includes using the heat transfer coefficients $\{h_{lmn}\}$ to determine at least one of (a) a flow rate through respective ones of the at least one opening, and (b) a cross-sectional area for respective ones of the at least one opening.

Another aspect of the invention resides in a thermal inspection system for a component comprising at least one complex internal passage arrangement defining at least one opening. The thermal inspection system includes a flow chamber configured to supply a fluid flow to the at least one complex internal passage arrangement. The thermal inspection system further includes a thermal monitoring device configured to detect multiple surface temperatures, either directly or indirectly, of the component at multiple times corresponding to a thermal response of the component to the fluid flow. The thermal inspection system further includes a processor configured to analyze the thermal response to determine a number of heat transfer coefficients $\{h_{lmn}\}$ corresponding to respective locations $\{l,m,n\}$ within the complex internal passage arrangement. The processor is further configured to use the heat transfer coefficients $\{h_{lmn}\}$ to determine at least one of (a) a flow rate through respective ones of the at least one opening, and (b) a cross-sectional area for respective ones of the at least one opening.

DRAWINGS

These and other features, aspects, and advantages of the present invention will become better understood when the following detailed description is read with reference to the accompanying drawings in which like characters represent like parts throughout the drawings, wherein:

FIG. 1 schematically depicts a thermal inspection system of the present invention;

DETAILED DESCRIPTION

As used herein, the phrase "transient thermal response" includes one or more local thermal responses of the component 10, or spatial thermal responses of regions of the component 10, or thermal response of the entire part 10.

As used herein, the phrase "complex internal passage arrangement" refers to a plurality of cavities (or passages) that are in fluid communication via at least one opening. According to a particular embodiment, the complex internal passage arrangement is part of an integral part, such that the internal and external walls are connected (as discussed, for example, below with reference to FIGS. 2 and 3). Non-limiting examples of integral parts include integral castings, welded assemblies, diffusion bonded structures, as well as integral parts formed by various surface deposition techniques, or material solidification methods (laser sintering, for example).

Figure 1:
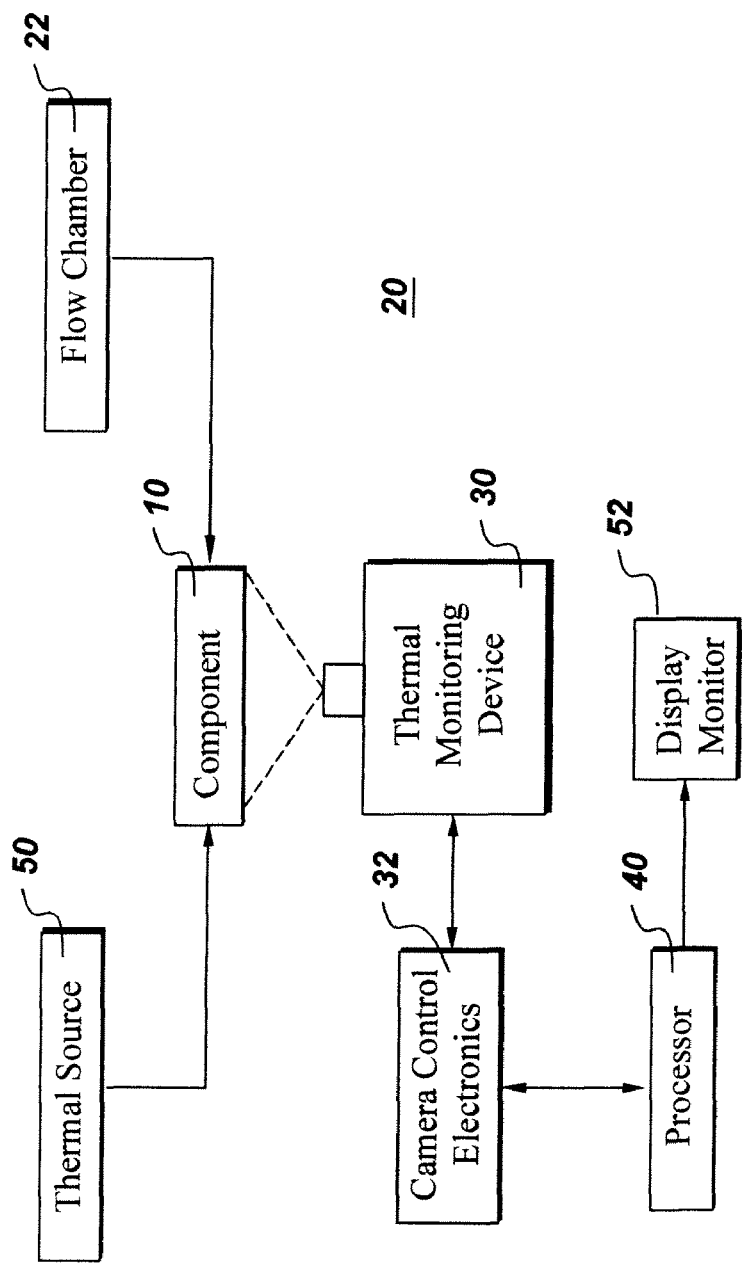
Figure 2:
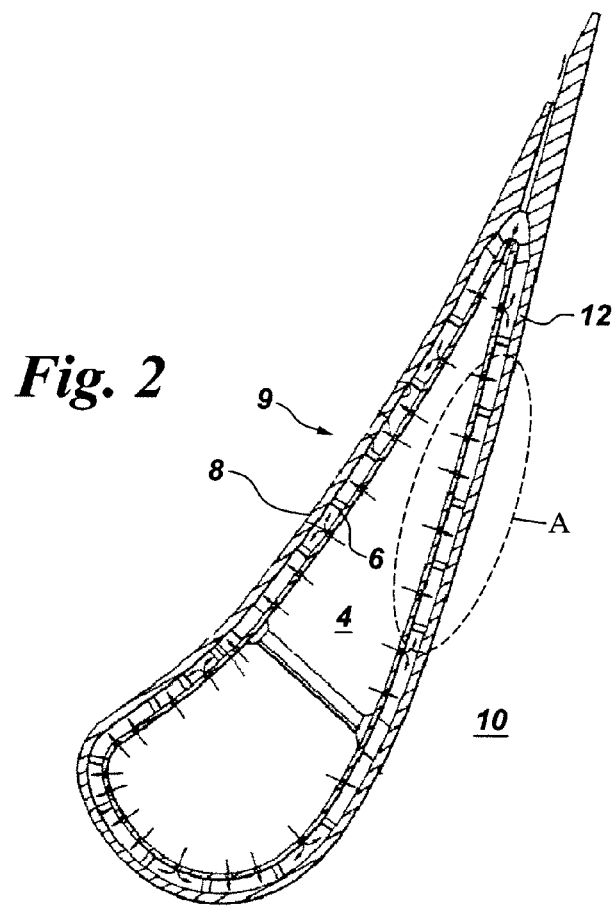
FIG. 2 shows an integrally cast, double-wall turbine airfoil in cross-sectional view.
Figure 3:
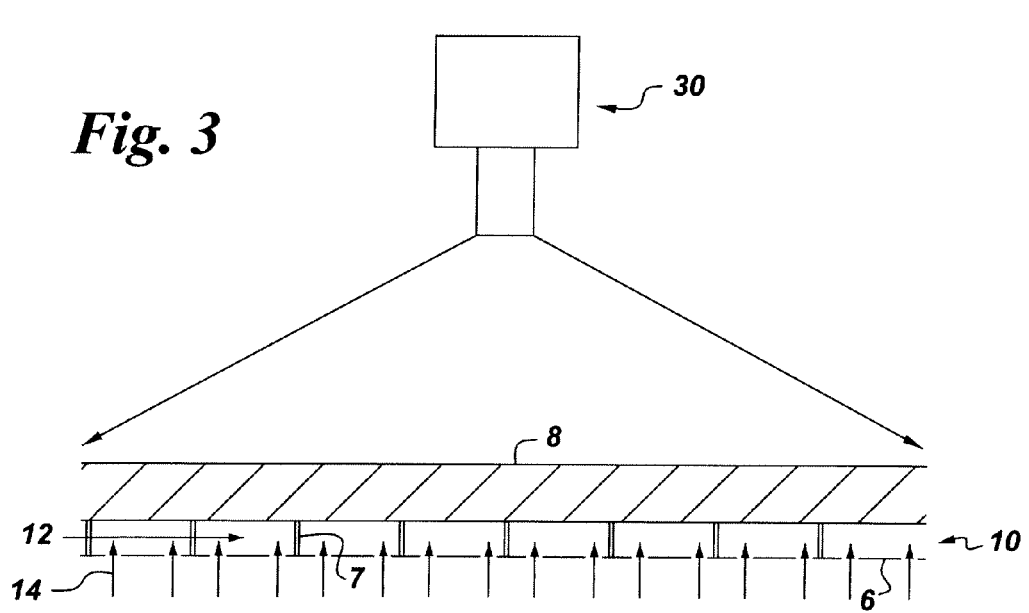
FIG. 3 is an enlarged view of portion A of the turbine airfoil shown in FIG. 2, as viewed by a thermal monitoring device in the thermal inspection system of FIG. 1.

A thermal inspection system 20 embodiment of the invention is discussed with reference to FIG. 1. The thermal inspection system 20 inspects a component 10 comprising at least one complex internal passage arrangement 12 defining at least one opening 14, as indicated in FIG. 3, for example. For the illustrated example, the complex internal passage arrangement 12 defines a plurality of openings 14. FIG. 2 shows an example, integrally cast turbine airfoil 10 in cross-sectional view. The turbine airfoil 10 shown in FIG. 2 is a double-wall airfoil 10 with an outer wall 9, which surrounds at least one radially extending cavity 4 which is operably constructed to receive cooling air through the platform (not shown). As shown, the outer double shell outer wall 9 extends generally in the chordwise direction C from the leading edge section through and between the suction side and the pressure side. As shown, the outer wall 9 is one piece, having an integrally formed double shell construction including an inner shell 6 spaced apart from an outer shell 8 with mechanically and thermally tying elements 7, which are integrally formed with and disposed between the inner and outer shells 6, 8.

The illustrated example shown in FIG. 2, provides a double shell construction of the outer wall 9 which only extends chordwise C through a portion of the airfoil 10 that does not generally include the trailing edge. This is not to be construed as a limitation, and an inner shell 6 could be constructed so as to extend into the trailing edge as well.

FIG. 3 shows an enlarged region A of the integrally cast outer wall 9 of turbine airfoil 10, as viewed by thermal monitoring device 30 (discussed below). As shown in FIG. 3, inner and outer shells 6, 8 define complex internal passage arrangement 12 with openings 14. The arrows in FIG. 3 indicate fluid flow through openings 14 into passage 12. Openings 14 cannot be inspected using conventional non-destructive techniques to determine if these features are open, closed, partially blocked or otherwise able to deliver the desired fluid flow to the outer shell 8. As discussed below, the present invention overcomes these shortcomings of the prior art. It should be noted that the invention is not limited to the inspection of integrally cast turbine airfoils. Rather, the turbine airfoil 10 shown in FIG. 2 is merely an illustrative example of a component 10 with a complex internal cooling passage arrangement 12 that can be inspected using the present invention. As noted above, the invention is equally applicable for inspection of other integral parts. Other non-limiting examples of components with complex internal passage arrangements include turbine vanes and blades and their platforms and endwalls, turbine shrouds, assemblies forming combustor chambers, assemblies forming transition pieces, blades having attached tip shrouds, flow distribution diaphragms, and exhaust nozzle assemblies.

Returning to FIG. 1, thermal inspection system 20 comprises a flow chamber 22 configured to supply a fluid flow to the at least one complex internal passage arrangement. Non-limiting examples of the fluid include air, nitrogen, steam, water and any Newtonian fluid. Thermal inspection system 20 further comprises a thermal monitoring device 30 configured to detect a plurality of surface temperatures, either directly or indirectly, of the component at a plurality of times corresponding to a thermal response of the component to the fluid flow. Thermal inspection system 20 further comprises a processor 40 configured to analyze the thermal response to determine a plurality of heat transfer coefficients $\{h_{lmn}\}$ corresponding to respective locations $\{l,m,n\}$ within the complex internal passage arrangement, and use the heat transfer coefficients $\{h_{lmn}\}$ to determine at least one of (a) a flow rate through respective ones of the openings, and (b) a cross-sectional area for respective ones of the openings. It should be noted that although the thermal monitoring device 30 typically detects a projected surface as a two-dimensional representation, the heat transfer coefficients $\{h_{lmn}\}$ correspond to the three-dimensional component. Each of the elements of thermal inspection system 20 is discussed in greater detail below.

For the example arrangement shown in FIG. 2, thermal inspection system 20 further includes thermal source 50 configured to heat or cool the component 10. Non-limiting examples of thermal source 50 include a lamp, an oven, and a refrigeration cover. However, it should be noted that the arrangement shown in FIG. 1 is merely one example of thermal inspection system 20. For example, in certain embodiments, thermal inspection system 20 does not include thermal source 50; instead, either a heating or a cooling fluid is supplied to component 10, which is initially at room (ambient) temperature. Depending on the embodiment, the actuation of the flow can be sudden or gradual.

For certain embodiments, the flow chamber 22 is configured to supply the fluid flow to the at least one complex internal passage arrangement, such that the component 10 exhibits a transient thermal response to the fluid flow. For example, for certain embodiments, the thermal source 50 initially cools the part 10, and the flow chamber 22 provides a heating fluid flow to the component 10 to generate a thermal transient within the component 10. In other embodiments, the thermal source 50 initially heats the component 10, and the flow chamber 22 provides a cooling fluid flow to the component 10 to generate a thermal transient within the component 10. In yet other embodiments, the component 10 is initially at room temperature, and the flow chamber 22 supplies either a cooling or a heating fluid flow to the component 10. As used herein, the term "transient thermal response" includes one or more local thermal responses of the component 10, or spatial thermal responses of regions of the component 10, or the entire component 10.

In other embodiments, the flow chamber 22 is configured to supply a steady fluid flow to the at least one complex internal passage arrangement. As used here, the phrase "steady fluid flow" should be understood to mean that the flow rate remains substantially steady during the time period of usable data, thereby providing a "steady thermal transient" during this time period. It should be noted that although a steady fluid flow is desired, in practice an exactly steady fluid flow is generally not achievable for the entire test time. These embodiments may also be implemented either with or without the thermal source 50.

It should be noted that the depiction of flow chamber 22 as a separate box is merely schematic. In practice, the flow chamber 22 may take the form of a plenum 22 with the component affixed to the top of the plenum. The plenum is supplied by a metered fluid source. Similarly, the representation in FIG. 1 of the thermal source 50 as a box is merely schematic and the thermal source may take the form, for example, of a heater jacket surrounding the component under test. For this example, the heater jacket would be used to heat the component 10 prior to data acquisition and would be removed prior to data acquisition.

A number of thermal monitoring devices 30 may be employed, including but not limited to, infrared detection devices such as infrared cameras, actuating pyrometers, and single point pyrometers. According to a particular embodiment, the thermal monitoring device 30 comprises an infrared camera 30 configured to capture a number of images corresponding to the thermal response of the component 10 to the fluid flow. One non-limiting example of an infrared camera is a ThermCAM® SC3000 infrared imaging camera, which is commercially available from FLIR Systems, with offices in Portland, Oreg., Boston, Mass., and Stockholm, Sweden. In addition, the thermal inspection system may further comprise a controller 32 configured to control and automate movement of the thermal monitoring device 30. For the embodiment shown in FIG. 1, the thermal inspection system further comprises a display monitor 52 coupled to the processor 40 to display the results of the thermal inspection.

The processor 40 is typically capable of capturing an image frame rate of adequate frequency, for example greater than 10 frames per second and typically greater than 15 frames per second, from the thermal monitoring device 30. The temperature-time history of the component 10 is readily measured by the use of the thermal monitoring device 30 and the processor 40. The temperature-time history of each location on an external surface of the component 10 may be recorded in the processor 40 for analysis. Detailed measurement of the external surface temperature distribution is dependent on the resolution of the thermal monitoring device 30, i.e. the density of a pixel array in the infrared camera 30. It will be appreciated that in an exemplary embodiment, the component 10 may be coated with known emissivity coatings to aid the infrared detection.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

The heat transfer coefficients $\{h_{lmn}\}$ for the component 10 can be derived as follows. As discussed in U.S. Pat. No. 6,804,622, Bunker et al. "Method and Apparatus for Nondestructive Thermal Inspection," processor 40 uses derived internal coolant temperatures within the complex internal passage arrangement to calculate the heat transfer coefficients $\{h_{lmn}\}$. The internal coolant temperature values are derived from the measured thermal response data obtained using thermal monitoring device 30, and at least one measured fluid temperature either at the inlet or at some point in the fluid flow circuit. According to particular embodiments, the internal heat transfer coefficient $\{h_{lmn}\}$ is computed for each location of interest $\{l,n,m\}$ on the component using a one-dimensional, lumped thermal capacity method:

$$\frac{T_w(\text{final}) - T_w(t)}{T_w(\text{final}) - T_w(t=0)} = e^{-\alpha t}, \text{ and} \quad \text{Eqn. 1}$$

$$\alpha = h/(\rho l C_p), \quad \text{Eqn. 2}$$

where $T_w$ is the internal temperature of the wall, $\alpha$ is the thermal capacitance coefficient, h is the heat transfer coefficient, $\rho$ is the material density, l is the thickness, and $C_p$ is the specific heat. A linear T(t) fit or a curve fit for T(t) at each location on article may be used. In this initial approximation, $T_w$ is assumed to be equal to $T_s$, the external surface temperature.

If the component 10 is simple, then the heat transfer coefficients, as determined by a one-dimensional lumped thermal conduction solution, are sufficient. If no flow circuit model is available for the complex internal passage arrangement, a flow circuit model may be replaced by a simple fixed distribution of fluid temperatures.

Although the example calculation described above is directed to a one-dimensional, lumped thermal capacity method, other methods and equations may be employed to determine the heat transfer coefficient $\{h_{lmn}\}$ at the locations of interest $\{l, n, m\}$. Non-limiting examples of other methods that can be used to calculate the heat coefficient $\{h_{lmn}\}$ include employing a two-dimensional method, in which the lateral conduction effects within the surface are computed to provide corrections to the one-dimensional estimate of the heat transfer coefficient. In addition, a fully three-dimensional finite element model of the part may be used to perform an inverse conduction analysis that determines the heat transfer coefficient, as discussed in U.S. Pat. No. 6,804,622.

Once the heat transfer coefficients $\{h_{lmn}\}$ are known, the following equation can be solved to determine either the flow rate through respective ones of the at least one opening or (b) the cross-sectional area for respective ones of the at least one opening:

$$h = (k/D) C R e^m P r^n, \quad \text{Eqn. 3}$$

where k is the thermal conductivity of the fluid, D is the hydraulic diameter of the connecting orifice, Re is the Reynolds number, and Pr is the Prandtl number. C, m and n are correlation constants. Equation 3 applies to a very large range of flow situations applicable to internal flows, whether compressible or incompressible. For any particular inspection geometry case, the correlation constants are known from prior research and testing, such as that performed in the design and development of the nominal part. To determine the cross-sectional area for one of the openings 14, Equation 3 is solved for D. If the hydraulic diameter of the orifice(s) is known, for example determined by x-ray imaging, then Equation 3 is solved for the Reynolds number, which provides the flow rate through the orifice. If the hydraulic diameter, or area, is not known, but the inspection is for a single orifice only, then Equation 3 is solved for the hydraulic diameter D. If the hydraulic diameter(s) is not known, and there are multiple orifices, then Equation 3 is solved for the average hydraulic diameter of the group of orifices. Alternately in this latter case, multiple inspections may be executed with various flow rates. While the various hydraulic diameters will not change between inspections, the heat transfer coefficients will change. A regression analysis can then be used to determine the individual hydraulic diameters and flow rates knowing that the form and fit of Equation 3 remains unchanged.

In particular embodiments, the processor 40 determines at least one of (a) the flow rate through respective ones of the at least one opening, and (b) the cross-sectional area for respective ones of the at least one opening, by comparing the heat transfer coefficients $\{h_{lmn}\}$ for the component 10 with corresponding heat transfer coefficients $\{h^{ref}_{lmn}\}$ for a reference part. The reference part has at least one complex, internal passage arrangement defining at least one opening. At least one of (a) the flow rate and (b) the cross-sectional area, for respective ones of the at least one opening is known for the reference part.

In other embodiments, the processor 40 is configured to determine at least one of (a) the flow rate through respective ones of the at least one opening, and (b) the cross-sectional area for respective ones of the at least one opening, by comparing the heat transfer coefficients $\{h_{l,m,n}\}$ for the component 10 with a statistical measure $\{S_{l,n,m}\}$ of a plurality of heat transfer coefficients $\{h'_{l,m,n}\}$ for a plurality of similar components. Non-limiting examples of statistical measures include mean values and standard deviations. According to a more particular embodiment, the individual heat transfer coefficients, as determined using an average or assumed hydraulic diameter, are compared to the statistical mean. If one or more of the heat transfer coefficients deviate too far from that mean, they are considered out-of-spec. For other more particular embodiments, processor 40 is further configured to calculate the statistical measure $\{S_{lnm}\}$ of the heat transfer coefficients $\{h'_{lmn}\}$ for the similar components. For other embodiments, correlations between reference/standard part(s) and information taken from the literature are developed. These correlations then serve as calibration for non-standard parts.

Figure 4:
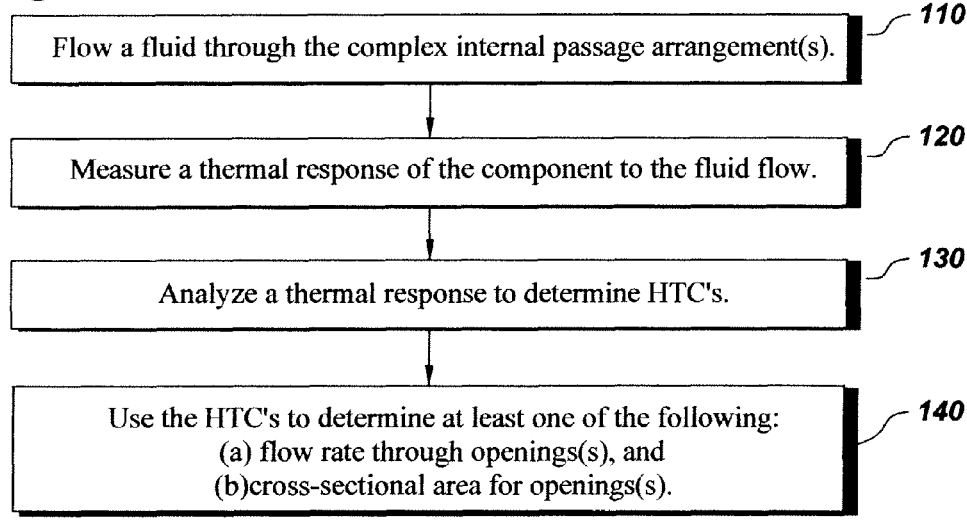
FIG. 4 illustrates a thermal inspection method embodiment of the present invention.

A thermal inspection method embodiment of the invention is discussed with reference to FIGS. 4-6. The thermal inspection method is used to inspect a component 10 comprising at least one complex internal passage arrangement 12 defining at least one opening 14. As indicated, for example in FIG. 4, the thermal inspection method includes at step 110 flowing a fluid through the at least one complex internal passage arrangement. The fluid has an initial temperature that differs from an initial temperature of the component. As noted above, non-limiting examples of the fluid include air, nitrogen, steam, water and any Newtonian fluid.

The thermal inspection method further includes at step 120 measuring a thermal response of the component to the fluid flow. According to particular embodiments, step 120 comprises detecting at least one surface temperature, either directly or indirectly, of the component at a number of times, for example by obtaining a series of infrared images of the component. As indicated in FIG. 4, the thermal inspection method further includes at step 130 analyzing the thermal response to determine a plurality of heat transfer coefficients $\{h_{lmn}\}$ corresponding to respective locations $\{l,m,n\}$ within the complex internal passage arrangement. The thermal inspection method further includes at step 140 using the heat transfer coefficients $\{h_{lmn}\}$ to determine at least one of (a) a flow rate through respective ones of the at least one opening, and (b) a cross-sectional area for respective ones of the at least one opening.

For particular embodiments, the fluid flow of step 110 induces a transient thermal response of the component. In other embodiments, step 110 comprises providing a steady flow of fluid through the at least one complex internal passage arrangement. Step 130 may comprise detecting at least one surface temperature, either directly or indirectly, of the component at a number of times.

For particular embodiments, step 140 comprises using the heat transfer coefficients to determine the flow rate through respective ones of the openings by comparing the heat transfer coefficients $\{h_{lmn}\}$ for the component 10 with corresponding heat transfer coefficients $\{h^{ref}_{lmn}\}$ for a reference part. The reference part has at least one complex, internal passage arrangement defining a number of openings. According to a more particular embodiment, the thermal inspection method further includes correlating the heat transfer coefficients $\{h^{ref}_{lmn}\}$ for the reference part to flow rate data.

For other embodiments, step 140 comprises using the heat transfer coefficients to determine the cross-sectional area for respective ones of the openings by comparing the heat transfer coefficients $\{h_{lmn}\}$ for the component 10 with corresponding heat transfer coefficients $\{h^{ref}_{lmn}\}$ for a reference part. According to a more particular embodiment, the thermal inspection method further includes correlating the heat transfer coefficients $\{h^{ref}_{lmn}\}$ for the reference part to cross-sectional area data.

Figure 5:
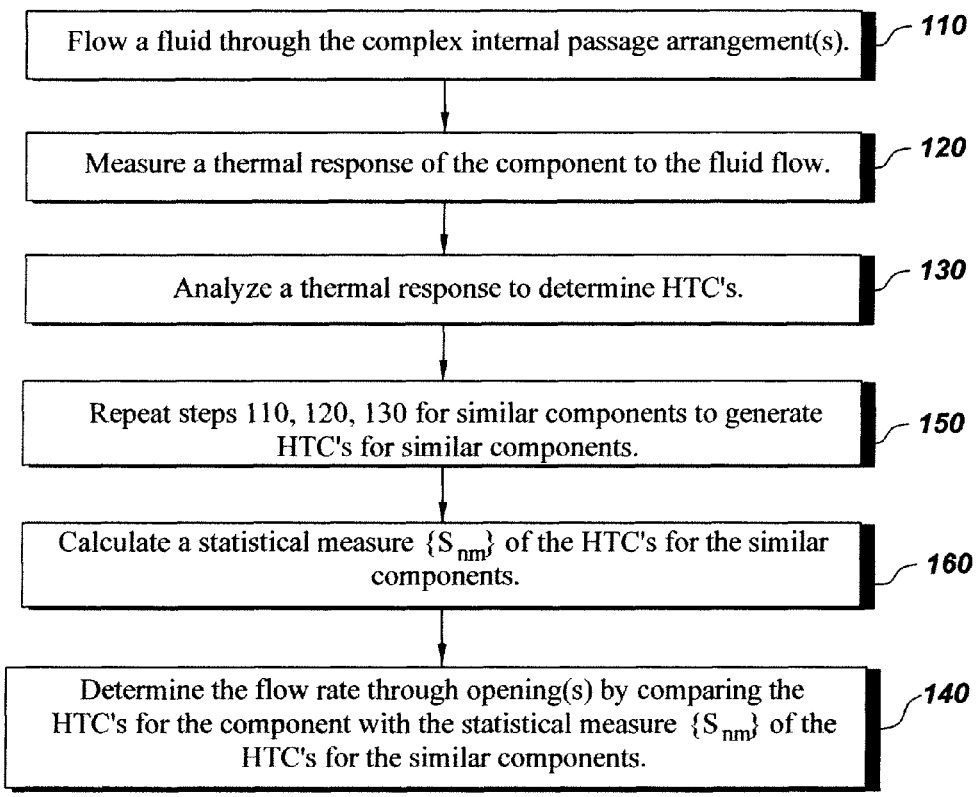
FIG. 5 illustrates a particular embodiment of the thermal inspection method.

As indicated in FIG. 5, the thermal inspection method optionally further includes, at step 150, repeating the flowing, measuring and analyzing steps for a number of similar components to generate heat transfer coefficients $\{h'_{lmn}\}$ for the similar components. The similar components have at least one complex internal passage arrangement with a number of openings. For the illustrated embodiment, the thermal inspection method further includes, at step 160, calculating a statistical measure $\{S_{lnm}\}$ of the heat transfer coefficients $\{h'_{lmn}\}$ for the similar components. The flow rate and/or area are included in the data used to arrive at the statistical measure. Alternatively, an estimated flow rate or area can be used with the statistical measure of the HTC. For this embodiment, step 140 comprises determining the flow rate through respective ones of the passages by comparing the heat transfer coefficients $\{h_{lmn}\}$ for the component with the statistical measure $\{S_{l,n,m}\}$ of the heat transfer coefficients $\{h'_{lmn}\}$ for the similar components. Non-limiting examples of the statistical measure $\{S_{lnm}\}$ of the heat transfer coefficients $\{h'_{lmn}\}$ for the similar components include an average value and a standard deviation. When employing this technique of comparison to a statistical measure, the hydraulic diameter may be known or assumed for each location. The use of an assumed hydraulic diameter will not affect the statistical measure and comparison, provided the hydraulic diameter is assumed to be a constant for common orifice locations within each part.

Figure 6:
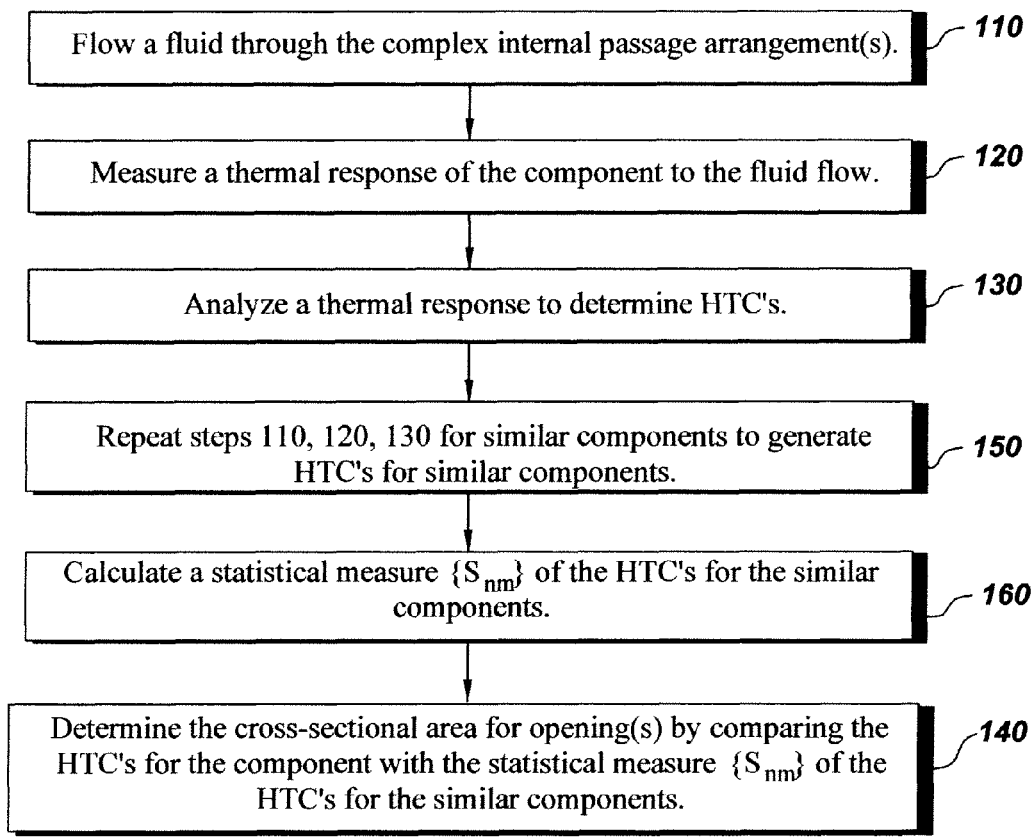
FIG. 6 illustrates another particular embodiment of the thermal inspection method.

Similarly, as indicated in FIG. 6, the thermal inspection method further optionally includes steps 150 and 160. For the embodiment illustrated by FIG. 6, step 140 comprises using the heat transfer coefficients to determine the cross-sectional area for respective ones of the passages by comparing the heat transfer coefficients $\{h_{lmn}\}$ for the component with the statistical measure $\{S_{lnm}\}$ of the heat transfer coefficients $\{h'_{lmn}\}$ for the similar components.

Figure 7:
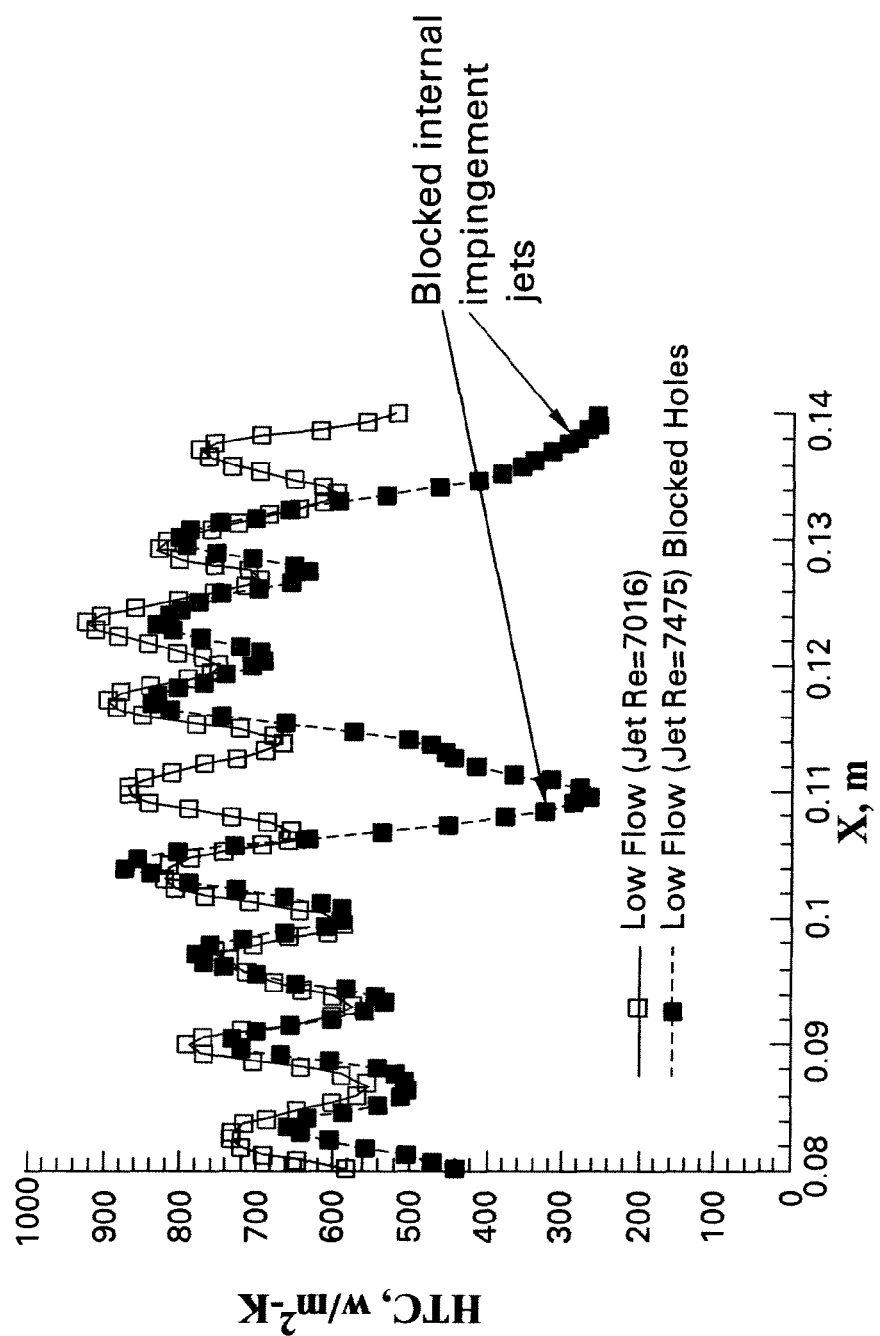
FIG. 7 illustrates the effect of blocked interior wall impingement jets on the exterior surface thermal response for a turbine airfoil.

Beneficially, the above-described thermal inspection system and method can be used to determine at least one of (a) a flow rate through and (b) a cross-sectional area for blind holes in integral parts, for example, in interior wall impingement jets within integrally cast turbine components. FIG. 7 illustrates the effect of blocked interior wall impingement jets on exterior surface thermal response. As indicated, the two local minima correspond to blocked internal impingement jets. As described in "The Measurement of Full-Surface Internal Heat Transfer Coefficients for Turbine Airfoils Using a Nondestructive Thermal Inertia Technique", Nirm V. Nirmalan et al., Journal of Turbomachinery, January 2003, Volume 125, Issue 1, pp. 83-89, which is hereby incorporated by reference in its entirety, the underlying data was obtained using an "airfoil" comprising a simple elliptical shape containing an impingement insert for cooling. Initially the airfoil (including insert) was heated to approximately 150° Celsius. The initial temperature distribution was steady and recorded by an infrared (IR) camera. At time t=0, cooling air was introduced into the impingement insert via a plenum, and the IR imaging was started at a rate of 15 frames per second. For this experiment, 5 of the 100 impingement jets were closed with epoxy. FIG. 7 shows the altered internal heat transfer for a location containing two blocked jets. The local heat transfer coefficients were reduced to nearly 30% of the original magnitudes, making the blocked jets very apparent.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A thermal inspection method for a component comprising at least one complex internal passage arrangement defining at least one opening, the thermal inspection method comprising:
    flowing a fluid through the at least one complex internal passage arrangement, wherein the fluid has an initial temperature that differs from an initial temperature of the component;
    measuring a thermal response of the component to the fluid flow;
    analyzing the thermal response to determine a plurality of heat transfer coefficients $\{h_{lmn}\}$ corresponding to a respective plurality of locations $\{l,m,n\}$ within the complex internal passage arrangement; and
    using the heat transfer coefficients $\{_{lmn}\}$ to determine a flow rate through respective ones of the at least one opening by comparing the heat transfer coefficients $\{_{lmn}\}$ for the component with corresponding ones of a plurality of heat transfer coefficients $\{h^{ref}_{lmn}\}$ for a reference part comprising at least one complex, internal passage arrangement defining at least one opening.

2. The thermal inspection method of claim 1, further comprising correlating the heat transfer coefficients $\{h^{ref}_{lmn}\}$ for the reference part to a plurality of flow rate data.

3. The thermal inspection method of claim 1, wherein said step of flowing the fluid induces a transient thermal response of the component, and wherein the measuring step comprises detecting at least one surface temperature, either directly or indirectly, of the component at a plurality of times.

4. The thermal inspection method of claim 1, wherein said step of flowing the fluid comprises providing a steady flow of fluid through the at least one complex internal passage arrangement, and wherein the measuring step comprises detecting at least one surface temperature, either directly or indirectly, of the component at a plurality of times.

5. The thermal inspection method of claim 1, wherein the measuring step comprises detecting at least one surface temperature, either directly or indirectly, of the component at a plurality of times.

6. The thermal inspection method of claim 5, wherein the detecting comprises obtaining a plurality of infrared images of the component.

7. A thermal inspection method for a component comprising at least one complex internal passage arrangement defining at least one opening, the thermal inspection method comprising:
    flowing a fluid through the at least one complex internal passage arrangement, wherein the fluid has an initial temperature that differs from an initial temperature of the component;
    measuring a thermal response of the component to the fluid flow;
    analyzing the thermal response to determine a plurality of heat transfer coefficients $\{h_{lmn}\}$ corresponding to a respective plurality of locations $\{l,m,n\}$ within the complex internal passage arrangement; and
    using the heat transfer coefficients $\{h_{lmn}\}$ to determine a cross-sectional area for respective ones of the at least one opening by comparing the heat transfer coefficients $\{h_{lmn}\}$ for the component with corresponding ones of a plurality of heat transfer coefficients $\{h^{ref}_{lmn}\}$ for a reference part.

8. The thermal inspection method of claim 7, further comprising correlating the heat transfer coefficients $\{h^{ref}_{lmn}\}$ for the reference part to a plurality of cross-sectional area data.

9. A thermal inspection method for a component comprising at least one complex internal passage arrangement defining at least one opening, the thermal inspection method comprising:
    flowing a fluid through the at least one complex internal passage arrangement, wherein the fluid has an initial temperature that differs from an initial temperature of the component;
    measuring a thermal response of the component to the fluid flow;
    analyzing the thermal response to determine a plurality of heat transfer coefficients $\{h_{lmn}\}$ corresponding to a respective plurality of locations $\{l,m,n\}$ within the complex internal passage arrangement;
    using the heat transfer coefficients $\{h_{lmn}\}$ to determine at least one of (a) a flow rate through respective ones of the at least one opening, and (b) a cross-sectional area for respective ones of the at least one opening;
    repeating the flowing, measuring and analyzing steps for a plurality of similar components having at least one complex internal passage arrangement, with at least one opening, to generate a plurality of heat transfer coefficients $\{h'_{lmn}\}$ for the similar components; and
    calculating a statistical measure $\{S_{lmn}\}$ of the heat transfer coefficients $\{h'_{lmn}\}$ for the similar components, wherein a plurality of data used to calculate the statistical measure comprises at least one of a flow rate and a cross-sectional area for respective ones of the similar components, wherein the using step comprises using the heat transfer coefficients to determine the flow rate through respective ones of the passages by comparing the heat transfer coefficients $\{h_{lmn}\}$ for the component with the statistical measure $\{S_{l,m,n}\}$ of the heat transfer coefficients $\{h'_{lmn}\}$ for the similar components.

10. A thermal inspection method for a component comprising at least one complex internal passage arrangement defining at least one opening, the thermal inspection method comprising:
    flowing a fluid through the at least one complex internal passage arrangement, wherein the fluid has an initial temperature that differs from an initial temperature of the component;
    measuring a thermal response of the component to the fluid flow;
    analyzing the thermal response to determine a plurality of heat transfer coefficients $\{h_{lmn}\}$ corresponding to a respective plurality of locations $\{l,m,n\}$ within the complex internal passage arrangement;
    using the heat transfer coefficients $\{h_{lmn}\}$ to determine at least one of (a) a flow rate through respective ones of the at least one opening, and (b) a cross-sectional area for respective ones of the at least one opening;
    repeating the flowing, measuring and analyzing steps for a plurality of similar components having at least one complex internal passage arrangement, with at least one opening, to generate a plurality of heat transfer coefficients $\{h'_{lmn}\}$ for the similar components; and
    calculating a statistical measure $\{S_{lmn}\}$ of the heat transfer coefficients $\{h'_{lmn}\}$ for the similar components,
    wherein the using step comprises using the heat transfer coefficients to determine the cross-sectional area for respective ones of the passages by comparing the heat transfer coefficients for the component with the statistical measure $\{S_{lmn}\}$ of the heat transfer coefficients $\{h'_{lmn}\}$ for the similar components.

11. A thermal inspection method for a component comprising at least one complex internal passage arrangement defining at least one opening, the thermal inspection method comprising:

flowing a fluid through the at least one complex internal passage arrangement, wherein the fluid has an initial temperature that differs from an initial temperature of the component;

measuring a thermal response of the component to the fluid flow;

analyzing the thermal response to determine a plurality of heat transfer coefficients $\{h_{lmn}\}$ corresponding to a respective plurality of locations $\{l,m,n\}$ within the complex internal passage arrangement; and using the heat transfer coefficients $\{h_{lmn}\}$ to determine a flow rate through respective ones of the at least one opening by solving an equation $h=(k/D)CRe^m Pr^n$, where k is a thermal conductivity of the fluid, D is a hydraulic diameter of a connecting orifice, Re is the Reynolds number, Pr is the Prandtl number, and C, m and n are correlation constants.

12. A thermal inspection method for a component comprising at least one complex internal passage arrangement defining at least one opening, the thermal inspection method comprising:

flowing a fluid through the at least one complex internal passage arrangement, wherein the fluid has an initial temperature that differs from an initial temperature of the component;

measuring a thermal response of the component to the fluid flow;

analyzing the thermal response to determine a plurality of heat transfer coefficients $\{h_{lmn}\}$ corresponding to a respective plurality of locations $\{l,m,n\}$ within the complex internal passage arrangement; and using the heat transfer coefficients to determine a cross-sectional area for respective ones of the at least one opening by solving an equation $h=(k/D)CRe^m Pr^n$, where k is a thermal conductivity of the fluid, D is a hydraulic diameter of a connecting orifice, Re is the Reynolds number, Pr is the Prandtl number, and C, m and n are correlation constants.

13. A thermal inspection system for a component comprising at least one complex internal passage arrangement defining at least one opening, the thermal inspection system comprising:

a flow chamber configured to supply a fluid flow to the at least one complex internal passage arrangement;

a thermal monitoring device configured to detect a plurality of surface temperatures, either directly or indirectly, of the component at a plurality of times corresponding to a thermal response of the component to the fluid flow; and a processor configured to:

analyze the thermal response to determine a plurality of heat transfer coefficients $\{h_{lmn}\}$ corresponding to a respective plurality of locations $\{l,m,n\}$ within the complex internal passage arrangement, calculate a statistical measure $\{S_{lmn}\}$ of a plurality of heat transfer coefficients $\{h'_{lmn}\}$ for a plurality of similar components, and use the heat transfer coefficients $\{h_{lmn}\}$ to determine at least one of (a) a flow rate through respective ones of the at least one opening, and (b) a cross-sectional area for respective ones of the at least one opening by comparing the heat transfer coefficients $\{h_{lmn}\}$ for the component with the statistical measure $\{S_{lmn}\}$ of the heat transfer coefficients $\{h'_{lmn}\}$ for the similar components.

14. The thermal inspection system of claim 13, further comprising a thermal source configured to heat or cool the component.

15. The thermal inspection system of claim 13, wherein said flow chamber is configured to supply a steady fluid flow to the at least one complex internal passage arrangement.

16. The thermal inspection system of claim 13, wherein said flow chamber is configured to supply the fluid flow to the at least one complex internal passage arrangement, such that the component exhibits a transient thermal response to the fluid flow.

17. The thermal inspection system of claim 13, wherein the thermal monitoring device comprises an infrared detector.

18. The thermal inspection system of claim 17, wherein the infrared detector comprises an infrared camera configured to capture a plurality of images corresponding to the thermal response of the component to the fluid flow.

* * * * *

UNITED STATES PATENT AND TRADEMARK OFFICE
CERTIFICATE OF CORRECTION

PATENT NO. : 7,909,507 B2
APPLICATION NO. : 12/101285
DATED : March 22, 2011
INVENTOR(S) : Bunker et al.

It is certified that error appears in the above-identified patent and that said Letters Patent is hereby corrected as shown below:

In Fig. 5, Sheet 3 of 5, for Tag "160", Line 1, delete "$\{S_{nm}\}$" and insert -- $\{S_{lnm}\}$ --, therefor.
In Fig. 5, Sheet 3 of 5, for Tag "140", Line 2, delete "$\{S_{nm}\}$" and insert -- $\{S_{lnm}\}$ --, therefor.
In Fig. 6, Sheet 4 of 5, for Tag "160", Line 1, delete "$\{S_{nm}\}$" and insert -- $\{S_{lnm}\}$ --, therefor.
In Fig. 6, Sheet 4 of 5, for Tag "140", Line 2, delete "$\{S_{nm}\}$" and insert -- $\{S_{lnm}\}$ --, therefor.

In Column 6, Line 22, Equation 3, delete "$Pr^a$," and insert -- $Pr^n$, --, therefor.
In Column 9, Line 17, in Claim 1, delete "$\{lmn\}$" and insert -- $\{h_{lmn}\}$ --, therefor.
In Column 9, Line 20, in Claim 1, delete "$\{lmn\}$" and insert -- $\{h_{lmn}\}$ --, therefor.
In Column 10, Line 25, in Claim 9, delete "$\{S_{lmn}\}$" and insert -- $\{S_{lnm}\}$ --, therefor.
In Column 10, Line 35, in Claim 9, delete "$\{S_{l,m,n}\}$" and insert -- $\{S_{l,n,m}\}$ --, therefor.
In Column 10, Line 60, in Claim 10, delete "$\{S_{lmn}\}$" and insert -- $\{S_{lnm}\}$ --, therefor.
In Column 10, Line 65, in Claim 10, delete "$\{S_{lmn}\}$" and insert -- $\{S_{lnm}\}$ --, therefor.
In Column 12, Line 15, in Claim 13, delete "$\{S_{lmn}\}$" and insert -- $\{S_{lnm}\}$ --, therefor.
In Column 12, Line 22, in Claim 13, delete "$\{h_{lmn}\}$" and insert -- $\{h_{l,m,n}\}$ --, therefor.
In Column 12, Line 23, in Claim 13, delete "$\{S_{lmn}\}$" and insert -- $\{S_{l,n,m}\}$ --, therefor.

Signed and Sealed this
Twenty-third Day of August, 2011

David J. Kappos
*Director of the United States Patent and Trademark Office*